United States Patent

Sanada

(10) Patent No.: US 10,923,736 B2
(45) Date of Patent: Feb. 16, 2021

(54) METHOD FOR PRODUCING FUEL CELL SEPARATOR, AND SEPARATOR MATERIAL

(71) Applicant: TOYOTA JIDOSHA KABUSHIKI KAISHA, Toyota (JP)

(72) Inventor: Yoshiyuki Sanada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/211,357

(22) Filed: Dec. 6, 2018

(65) Prior Publication Data

US 2019/0190036 A1 Jun. 20, 2019

(30) Foreign Application Priority Data

Dec. 20, 2017 (JP) .............................. JP2017-244367

(51) Int. Cl.
*H01M 8/02* (2016.01)
*H01M 8/0228* (2016.01)
*H01M 8/0258* (2016.01)
*H01M 8/0213* (2016.01)
*H01M 8/0221* (2016.01)
(Continued)

(52) U.S. Cl.
CPC ......... *H01M 8/0228* (2013.01); *C01B 32/182* (2017.08); *C01B 32/194* (2017.08); *C01B 32/198* (2017.08); *H01M 2/145* (2013.01); *H01M 2/1686* (2013.01); *H01M 8/0206* (2013.01); *H01M 8/0213* (2013.01); *H01M 8/0221* (2013.01); *H01M 8/0258* (2013.01);
(Continued)

(58) Field of Classification Search
CPC .... H01M 8/02; H01M 8/0338; H01M 8/0258; H01M 8/0206; H01M 8/0221; H01M 8/04
See application file for complete search history.

(56) References Cited

U.S. PATENT DOCUMENTS

2001/0055710 A1* 12/2001 Saito ................... H01M 8/0226
264/115
2002/0107318 A1* 8/2002 Yamada .................. C04B 26/10
524/495
(Continued)

FOREIGN PATENT DOCUMENTS

JP 2012-160406 A 8/2012
JP 2014-146550 A 8/2014
(Continued)

*Primary Examiner* — Kenneth J Douyette
(74) *Attorney, Agent, or Firm* — Dickinson Wright PLLC

(57) ABSTRACT

Provided are a method for producing a fuel cell separator, and a separator material that can prevent carbon in a carbon layer formed on the surface of a metal substrate from being detached during press forming, and thus can suppress failures in the press forming. The method is a method for producing a fuel cell separator having formed thereon gas flow channels through which fuel gas or oxidant gas to be supplied to a fuel cell stack flows, the method including preparing a plate-shaped separator material including a titanium substrate, a carbon layer covering the titanium substrate, and a resin layer covering the carbon layer; press-forming the prepared separator material into the shape of the separator such that the separator has the gas flow channels formed thereon; and removing the resin layer from the press-formed separator.

4 Claims, 6 Drawing Sheets

(51) Int. Cl.
  *H01M 8/0206* (2016.01)
  *C01B 32/194* (2017.01)
  *C01B 32/198* (2017.01)
  *C01B 32/182* (2017.01)
  *H01M 2/16* (2006.01)
  *H01M 2/14* (2006.01)

(52) U.S. Cl.
  CPC ...... *C01B 2204/22* (2013.01); *C01B 2204/32* (2013.01)

(56) References Cited

U.S. PATENT DOCUMENTS

| | | | |
|---|---|---|---|
| 2009/0098447 A1* | 4/2009 | Murakami | H01M 8/0226 429/129 |
| 2015/0325863 A1 | 11/2015 | Takada et al. | |
| 2016/0268611 A1 | 9/2016 | Suzuki et al. | |
| 2016/0336600 A1 | 11/2016 | Kagawa et al. | |
| 2017/0194657 A1 | 7/2017 | Suzuki et al. | |

FOREIGN PATENT DOCUMENTS

| | | |
|---|---|---|
| JP | 2015-111548 A | 6/2015 |
| JP | 2016-122642 A | 7/2016 |
| KR | 20160067959 A | 6/2016 |
| KR | 20160122843 A | 10/2016 |
| KR | 20160145722 A | 12/2016 |

\* cited by examiner

METHOD FOR PRODUCING FUEL CELL SEPARATOR, AND SEPARATOR MATERIAL

CROSS REFERENCE TO RELATED APPLICATIONS

The present application claims priority from Japanese patent application JP 2017-244367 filed on Dec. 20, 2017, the content of which is hereby incorporated by reference into this application.

BACKGROUND

Technical Field

The present disclosure relates to a method for producing a fuel cell separator, and a separator material.

Background Art

A fuel cell stack has a plurality of stacked fuel cells, each including a solid polymer electrolyte membrane and anode and cathode electrodes sandwiching the solid polymer electrolyte membrane, as unit cells with separators interposed therebetween, each separator having formed thereon gas flow channels through which gas (e.g., hydrogen gas or oxidant gas) flows. Such a fuel cell separator has a role to cause current generated in the stack to flow through an adjacent cell, and therefore, a high conductive property and conductive durability are desired.

As a method for producing a fuel cell separator, for example, JP 2014-146550 A discloses a method for producing a fuel cell separator that includes forming a coating layer containing carbon on the surface of a titanium substrate made of titanium or titanium alloy, and performing heat treatment on the titanium substrate, thereby forming a carbon layer on the surface of the titanium substrate.

Besides, JP 2016-122642 A, for example, discloses a production method that includes coating the surface of a titanium substrate with carbon black so as to form a carbon black layer, and performing heat treatment on the coated substrate under a low-partial-oxygen-pressure atmosphere, thereby allowing titanium atoms in the substrate to diffuse outward into the carbon black layer. By such outward diffusion of titanium atoms, a mixture layer that contains the carbon black and titanium oxide holding the carbon black is formed.

SUMMARY

A separator material produced with the production method described in JP 2014-146550 A or JP 2016-122642 A as described above is further press-formed into the shape of a separator so that gas flow channels are formed thereon. During the press forming, carbon in the carbon layer formed on the metal substrate such as the titanium substrate may be detached in the form of particles or small pieces from the carbon layer. When the detached carbon sticks to a die and is accumulated on the die surface or sticks to a next separator material to be press-formed, there is a possibility that pressing defects may occur in the resulting separator.

The present disclosure has been made in view of the foregoing, and provides a method for producing a fuel cell separator, and a separator material that can prevent carbon in a carbon layer formed on the surface of a metal substrate from being detached during press forming, and thus can suppress failures in the press forming.

Accordingly, the method for producing a fuel cell separator in accordance with the present disclosure is a method for producing a fuel cell separator, the fuel cell separator having formed thereon a gas flow channel through which one of fuel gas or oxidant gas to be supplied to a fuel cell flows, the method including: preparing a plate-shaped separator material including a metal substrate, a carbon layer covering the metal substrate, and a resin layer covering the carbon layer; press-forming the prepared separator material into the shape of the separator such that the separator has the gas flow channel formed thereon; and removing the resin layer from the pressed-formed separator.

According to the present disclosure, since the carbon layer of the separator material is covered with the resin layer, even when cracks are generated in the carbon layer during press forming, the resin layer can prevent carbon in the carbon layer from being detached in the form of particles or small pieces from the carbon layer. Therefore, there is no possibility that carbon in the carbon layer will stick to a die. Consequently, pressing defects in the resulting separator due to sticking of carbon derived from the carbon layer to the die can be suppressed. Further, there is no need to apply excess machining oil to the die surface to suppress sticking of carbon in the carbon layer to the die. Therefore, since there is no possibility that the press forming of the separator will be disturbed due to the excess machining oil, the press-forming accuracy of the separator will not decrease.

Herein, the materials of the carbon layer and the metal substrate of the prepared separator material are not particularly limited as long as the carbon layer has a sticking force to the surface of the metal substrate and the carbon layer and the metal substrate each have a conductive property, and the method for forming the carbon layer is not particularly limited, either. However, in some embodiments, the preparing may include preparing as the metal substrate a titanium substrate containing one of titanium or titanium alloy, and applying carbon black to the titanium substrate, thereby forming a carbon black layer, and performing heat treatment on the titanium substrate having the carbon black layer formed thereon, thereby diffusing titanium atoms from a surface of the titanium substrate into the carbon black layer, and thus forming a mixture layer as a part of the carbon layer on the surface of the titanium substrate, the mixture layer containing the carbon black of the carbon black layer and titanium oxide holding the carbon black.

According to such a configuration of the separator material, the titanium substrate is covered with the carbon layer containing carbon black. Therefore, although the carbon black is likely to be detached from the carbon layer during press forming, such detachment can be avoided by the resin layer. Further, although redundant carbon black of the carbon black layer may remain on the surface of the mixture layer, and the redundant carbon black is also likely to be detached from the carbon layer during press forming, such detachment can also be avoided by the resin layer.

Furthermore, since the redundant carbon black remaining on the mixture layer can be removed from the separator in removal of the resin layer, the redundant carbon black need not be removed before the press forming. Therefore, the steps can be simplified.

Herein, the material of the resin layer covering the carbon layer of the prepared separator substrate is not particularly limited as long as detachment of carbon from the carbon layer can be prevented, and the method for forming the resin layer is not limited, either. However, in some embodiments, the preparing may include applying a suspension to a surface of the carbon layer, the suspension being obtained by dispersing in a liquid medium resin particles of thermoplastic resin as a base material of the resin layer, and heating the resin particles to a temperature of greater than or equal to the softening point of the resin particles and drying the liquid medium, thereby forming the resin layer on the surface of the carbon layer.

According to such a configuration, as a suspension containing resin particles is applied to the surface of the carbon layer, the resin particles can be uniformly dispersed on the surface of the carbon layer. When the resin particles are heated to a temperature of greater than or equal to the softening point thereof, a more uniform, thinner resin layer can be formed over the carbon layer. Consequently, not only can the press-forming accuracy be enhanced, but also the resin layer can be removed from the carbon layer in a short time during the removal.

Further, in some embodiments, the resin particles may include resin particles of acrylic resin, and the suspension may further contain a dispersant made of a fatty acid adapted to disperse the resin particles in the liquid medium.

According to such a configuration, as the resin particles include resin particles of acrylic resin, the resin particles of acrylic resin can be dispersed in the suspension more uniformly by the dispersant made of a fatty acid. Accordingly, a more uniform, thinner resin layer can be formed over the carbon layer as described above. Since the acrylic resin contained in the resin layer has a high sticking force to carbon, titanium, and the like, the resin layer is unlikely to peel off the carbon layer during press forming. Further, since the dispersant made of a fatty acid is dispersed in the resin layer and functions as a lubricant during press forming, press formability can be enhanced. Furthermore, since the acrylic resin dissolves in a strong alkaline solvent, the resin layer can be easily removed using a strong alkaline solvent after the press forming without the separator oxidized.

In this specification, a fuel cell separator material is also disclosed. A fuel cell separator material in accordance with the present disclosure is a fuel cell separator material in a plate shape, the fuel cell separator material being a material for a fuel cell separator having formed thereon a gas flow channel through which one of fuel gas or oxidant gas to be supplied to a fuel cell flows, the fuel cell separator material including: a metal substrate; a carbon layer covering the metal substrate; and a resin layer covering the carbon layer.

According to the present disclosure, since the carbon layer of the separator material is covered with the resin layer, even when the separator material is press-formed into the shape of a separator and cracks are generated in the carbon layer, the resin layer can prevent carbon in the carbon layer from being detached in the form of particles or small pieces from the carbon layer. Therefore, there is no possibility that carbon in the carbon layer will stick to a die and the like. Consequently, pressing defects in the resulting separator due to sticking of carbon derived from the carbon layer to the die can be suppressed. Further, there is no need to apply excess machining oil to the die surface to suppress sticking of carbon in the carbon layer to the die. Therefore, since there is no possibility that the press forming of the separator will be disturbed due to the excess machining oil, the press-forming accuracy of the separator will not decrease.

Herein, the materials of the carbon layer and the metal substrate of the prepared separator material are not particularly limited as long as the carbon layer has a sticking force to the surface of the metal substrate and the carbon layer and the metal substrate each have a conductive property. However, in some embodiments, the metal substrate may be a titanium substrate containing one of titanium or titanium alloy, and the carbon layer may include a mixture layer containing carbon black and titanium oxide holding the carbon black.

Herein, the carbon layer formed over the titanium substrate of the separator material contains carbon black. Therefore, although the carbon black is likely to be detached from the carbon layer during press forming, the configuration herein can prevent such detachment of the carbon black from the carbon layer due to the presence of the resin layer.

In some embodiments, the resin layer may contain thermoplastic resin as a base material of the resin layer and a lubricant dispersed in the resin layer; the thermoplastic resin may include acrylic resin; and the lubricant may be a fatty acid.

According to such a configuration, since the acrylic resin contained in the resin layer has a high sticking force to carbon, titanium, and the like, the resin layer is unlikely to peel off the carbon layer during press forming. Further, since the lubricant made of a fatty acid is dispersed in the resin layer, press formability can be enhanced. Furthermore, since the acrylic resin dissolves in a strong alkaline solvent, the resin layer can be easily removed using a strong alkaline solvent after the press forming without the separator oxidized.

According to the present disclosure, carbon in a carbon layer formed on the surface of a metal substrate can be prevented from being detached during press forming, and thus, failures in the press forming can be suppressed.

DETAILED DESCRIPTION

Hereinafter, the configuration of the present disclosure will be described in detail on the basis of exemplary embodiments illustrated in the accompanying drawings. Although the following embodiments illustrate examples in which the present disclosure is applied to a fuel cell stack or a fuel cell system including the fuel cell stack mounted on a fuel cell vehicle, the range of application of the present disclosure is not limited thereto.

1. Regarding fuel cell stack 10 including separators 3

Figure 1:
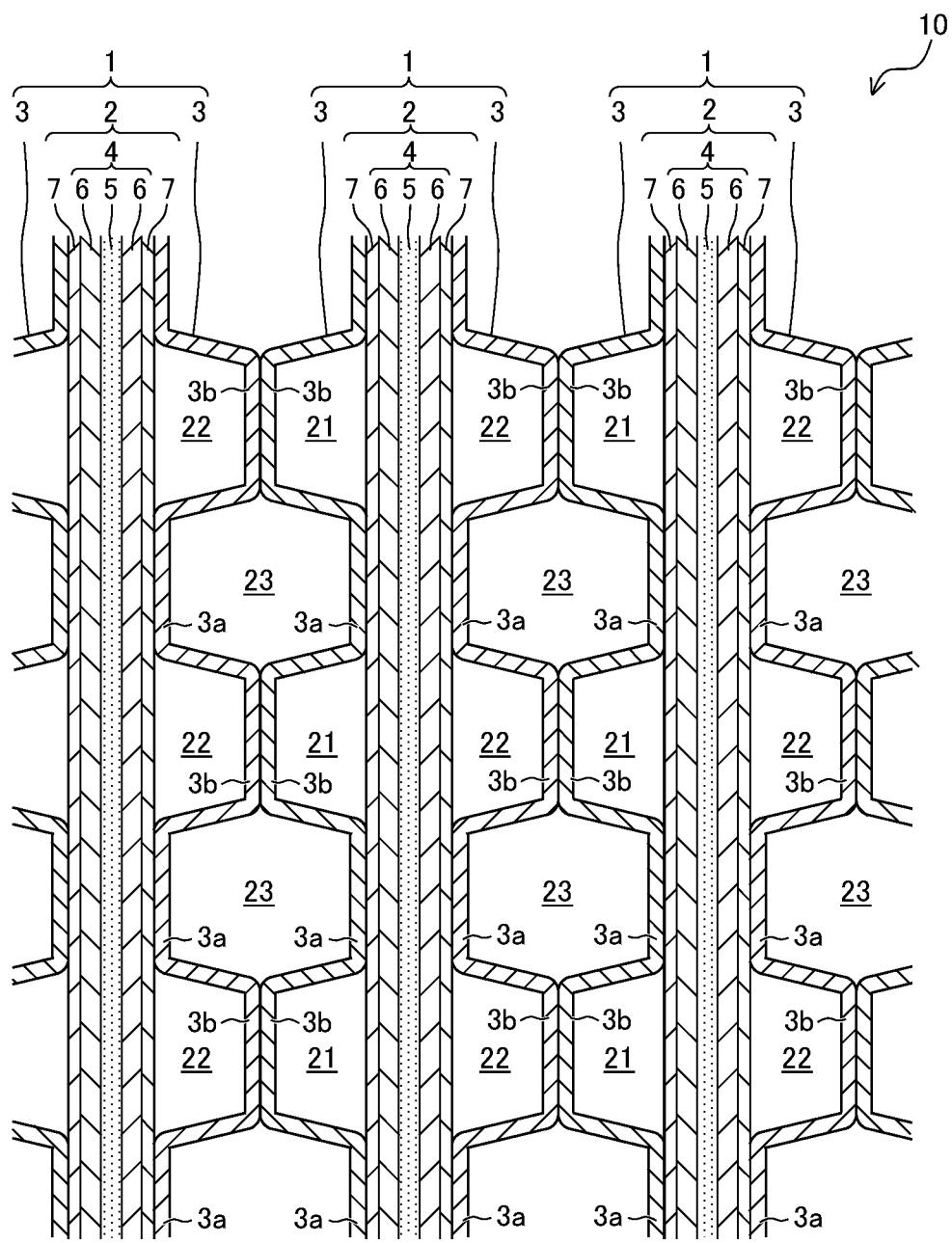
FIG. 1 a schematic cross-sectional view of the primary portion of a fuel cell stack including separators in accordance with an embodiment of the present disclosure.

FIG. 1 is a schematic cross-sectional view of the primary portion of a fuel cell stack 10 including separators 3 in accordance with an embodiment of the present disclosure. As illustrated in FIG. 1, the fuel cell stack (stacked fuel cells) 10 has a plurality of stacked cells (unit cells) 1. Each cell 1 is a polymer electrolyte fuel cell that generates an electromotive force when an electrochemical reaction occurs between oxidant gas (for example, air) and fuel gas (for example, hydrogen gas). The cell 1 includes a MEGA (Membrane Electrode & Gas Diffusion Layer Assembly) 2 and separators (fuel cell separators) 3 adapted to be in contact with the MEGA 2 so as to separate the MEGA (power generating portion) 2 from MEGAs 2 of adjacent fuel cells. It should be noted that in this embodiment, the MEGA 2 is sandwiched between a pair of separators 3, 3.

The MEGA 2 is an integral structure of a membrane electrode assembly (MEA) 4 and gas diffusion layers 7, 7 arranged on opposite sides thereof. The membrane electrode assembly 4 includes an electrolyte membrane 5 and a pair of electrodes 6 and 6 that are joined so as to sandwich the electrolyte membrane 5 therebetween. The electrolyte membrane 5 is a proton-conducting ion exchange membrane formed of a solid polymer material, and each electrode 6 is formed of a porous carbon material having a catalyst, such as platinum, carried thereon, for example. The electrode 6 arranged on one side of the electrolyte membrane 5 serves as an anode, and the electrode 6 on the other side serves as a cathode. Each gas diffusion layer 7 is formed of a gas-permeable conductive member, such as a carbon porous body like carbon paper or carbon cloth, or a metal porous body like a metallic mesh or foam metal, for example.

In this embodiment, the MEGA 2 is the power generation portion of the fuel cell stack 10, and the separators 3 are in contact with the gas diffusion layers 7 of the MEGA 2. When the gas diffusion layers 7 are omitted, the membrane electrode assembly 4 is the power generation portion, and in such a case, the separators 3 are in contact with the membrane electrode assembly 4. Therefore, the power generation portion of the fuel cell stack 10 includes the membrane electrode assembly 4 and is in contact with the separators 3. Each separator 3 is a member made of metal with excellent conductivity, gas impermeability, and the like, such as titanium, titanium alloy, or stainless steel, as a base material, and contact portions 3a on one side of the separator 3 abut the gas diffusion layer 7 of the MEGA 2, and contact portions 3b on the other side thereof abut one side of an adjacent separator 3. The contact portions 3a, 3b are current collecting portions for collecting power generated by the MEGA 2 that is the power generating portion.

In this embodiment, each separator 3 is formed in a wave shape. Specifically, the separator 3 has such a shape that the shapes of waves form trapezoids with equal legs, the top portion of each wave is flat, and opposite ends of the top portion are angular with equal angles. The shapes of each separator 3 seen from the front side and the rear side are almost the same. The top portions (projections) of the separator 3 are the contact portions 3a, 3b thereof. Specifically, the contact portions 3a that are the top portions of the separator 3 are in surface contact with one of the gas diffusion layers 7 of the MEGA 2, and the contact portions 3b that are the top portions of another separator 3 are in surface contact with the other gas diffusion layer 7 of the MEGA 2.

Gas flow channels 21 defined between the gas diffusion layer 7 on one electrode (that is, the anode) 6 side and the separator 3 are channels through which fuel gas circulates, and gas flow channels 22 defined between the gas diffusion layer 7 on the other electrode (that is, the cathode) 6 side and the separator 3 are channels through which oxidant gas circulates. When fuel gas is supplied to the gas flow channels 21 on one side and oxidant gas is supplied to the gas flow channels 22 on the side opposite the gas flow channels 21 with the cell 1 sandwiched therebetween, an electrochemical reaction occurs within the cell 1 so that an electromotive force is generated.

Further, two adjacent cells 1 are arranged such that an electrode 6 to serve as an anode and an electrode 6 to serve as a cathode are arranged opposite each other. In addition, contact portions 3b on the rear surface side of a separator 3, which is arranged along an electrode 6 to serve as an anode of a given cell 1, and contact portions 3b on the rear surface side of a separator 3, which is arranged along an electrode 6 to serve as a cathode of another cell 1, are in surface contact with each other. Water as refrigerant for cooling the cells 1 circulates through spaces 23 defined between the separators 3,3 that are in surface contact with each other between the two adjacent cells 1.

2. Method for producing separator 3

Figure 2:
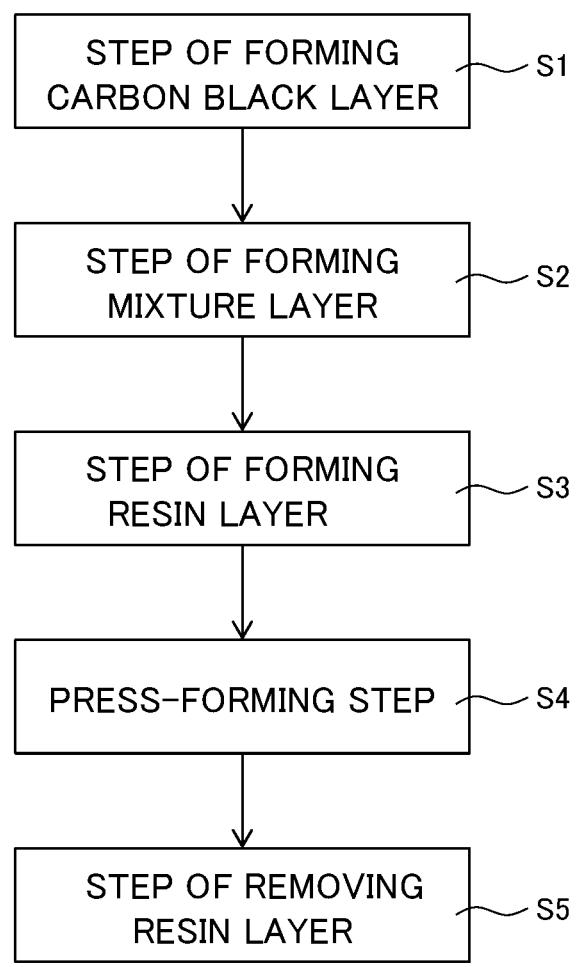
FIG. 2 is a flowchart for illustrating a method for producing the fuel cell separator illustrated in FIG. 1.

A method for producing the separator 3 in accordance with this embodiment will be described with reference to FIGS. 2 to 7. FIG. 2 is a flowchart for illustrating the method for producing the fuel cell separator 3 illustrated in FIG. 1. It should be noted that, while the following describes the method for producing the separator 3 on which the gas flow channels 21 for fuel gas are formed, the method for producing the separator 3 on which the gas flow channels 22 for oxidant gas are formed is similar, and thus, the detailed description will not be further elaborated here.

2-1. Regarding step S1 of forming carbon black layer

Figure 3:
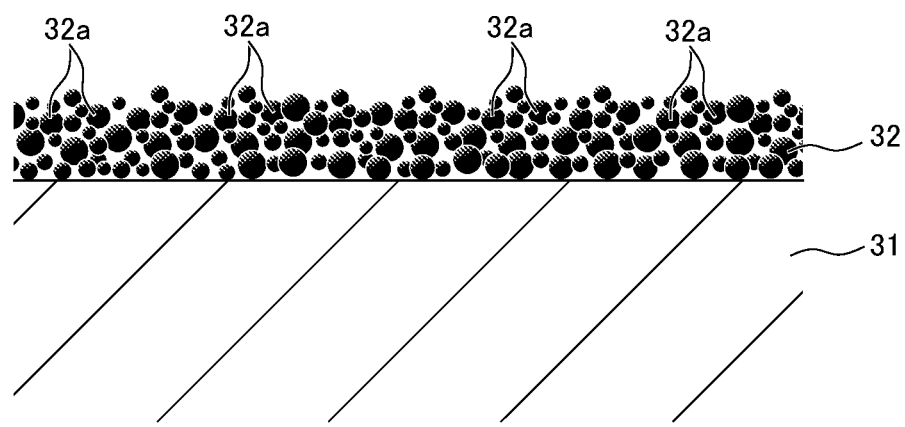
FIG. 3 is a schematic enlarged cross-sectional view of a titanium substrate and a carbon black layer after a step of forming the carbon black layer illustrated in FIG. 2.

First, a step S1 of forming a carbon black layer illustrated in FIG. 2 is performed. FIG. 3 is a schematic enlarged cross-sectional view of a titanium substrate 31 and a carbon black layer 32 after the step S1 of forming the carbon black layer illustrated in FIG. 2. In this step, the titanium substrate 31 in a plate shape is prepared, and the carbon black layer 32 is formed on a surface thereof.

Specifically, first, a plate-shaped titanium material made of a cold rolled material is prepared as the titanium substrate 31. The thickness of the titanium substrate 31 may be 0.05 to 1 mm, for example. The titanium substrate 31 is made of titanium or titanium alloy. Examples of titanium include types 1 to 4 (corresponding to grades 1 to 4 of ASTM) specified in the Japanese Industrial Standard H 4600. Examples of titanium alloy include Ti-Al, Ti-Nb, Ti-Ta, Ti-6Al-4 V, and Ti-Pd. Although the titanium substrate 31 is prepared as the metal substrate in this embodiment, the metal substrate may be a stainless steel substrate or the like as long as a carbon layer made of carbon can be formed (deposited) on the metal substrate as described below.

Next, a carbon black layer 32 is formed on the surface (planar surface) of the titanium substrate 31. After carbon black 32a is applied to the surface of the prepared titanium substrate 31, the carbon black 32a is dried to form the carbon black layer 32. The carbon black 32a may be applied in a state in which the carbon black 32a is dispersed in a dispersion medium such as water or ethanol. As a method of application, coating using a roll coater, spray coating, or the like can be used. However, the method of application is not limited thereto as long as the carbon black layer 32 can be formed on the titanium substrate 31.

2-2. Regarding step S2 of forming mixture layer

Figure 4:
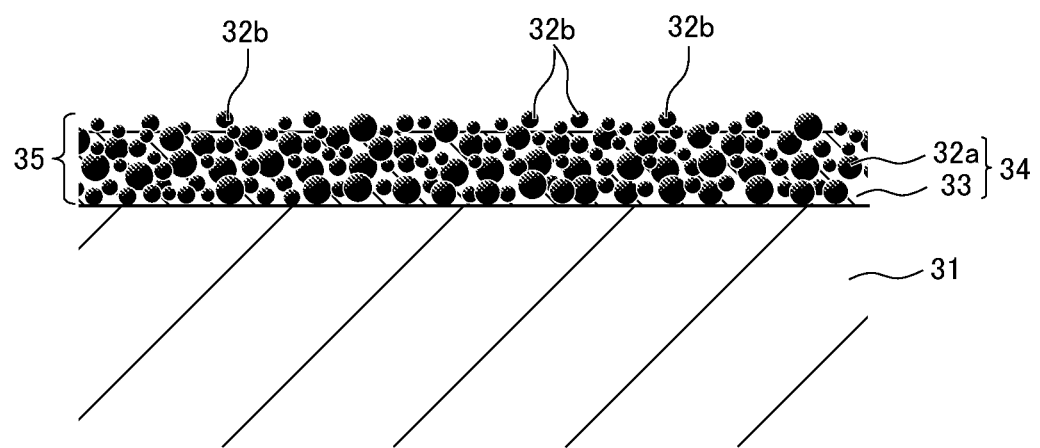
FIG. 4 is a schematic enlarged cross-sectional view of the titanium substrate and the carbon layer after a step of forming a mixture layer illustrated in FIG. 2.

Next, a step S2 of forming a mixture layer illustrated in FIG. 2 is performed. FIG. 4 is a schematic enlarged cross-sectional view of the titanium substrate 31 and a carbon layer 35 after the step S2 of forming the mixture layer illustrated in FIG. 2.

In this step, heat treatment is performed on the titanium substrate 31 having formed thereon the carbon black layer 32 illustrated in FIG. 3. By the heat treatment, titanium atoms are diffused from the surface of the titanium substrate 31 outward into the carbon black layer 32, and the titanium atoms diffused outward are caused to react with oxygen gas so as to generate titanium oxide 33. Consequently, a mixture layer 34 made of the carbon black 32a of the carbon black layer 32 and the titanium oxide 33 holding the carbon black 32a is formed as a part of the carbon layer 35 on the surface of the titanium substrate 31. The thickness of the mixture layer 34 may be in the range of 40 to 100 nm.

The heat treatment for the titanium substrate 31 having the carbon black layer 32 formed thereon may be performed in a low oxygen atmosphere containing oxygen gas at an oxygen partial pressure of 1 to 100 Pa. If the oxygen partial pressure is less than 1 Pa, the titanium atoms cannot be oxidized sufficiently, and if the oxygen partial pressure is over 100 Pa, carbon dioxide may be generated by the reactions between carbon and oxygen. The heating temperature may be in the range of 550 to 700° C. The heating time may be in the range of 5 to 60 seconds. Setting each of the heating temperature and the heating time to such a range can obtain the mixture layer 34 with a thickness that allows the titanium oxide 33 to sufficiently hold the carbon black 32a.

In this embodiment, the carbon layer 35 is formed of the mixture layer 34 in which the carbon black 32a is held by the titanium oxide 33, and redundant carbon black 32b stuck to the surface of the mixture layer 34. The redundant carbon black 32b is a part of the carbon black 32a of the carbon black layer 32 illustrated in FIG. 3 that is not held by the titanium oxide 33 as the titanium atoms diffused outward have not reached that part. The redundant carbon black 32b is removed in a subsequent step. It should be noted that if the redundant carbon black 32b is removed before a next step S3 of forming a resin layer, the carbon layer 35 described below is formed of the mixture layer 34.

Although the step S1 of forming the carbon black layer and the step S2 of forming the mixture layer are performed in this embodiment, instead of such steps, the method described in JP 2014-146550 A above may be used to form the carbon layer, and a carbon layer (or a carbon film) may be formed (or deposited) using plasma CVD, plasma PVD, or the like. In such a case, for example, a stainless steel substrate may be used as the metal substrate instead of the titanium substrate.

2-3. Regarding step S3 of forming resin layer

Figure 5A:
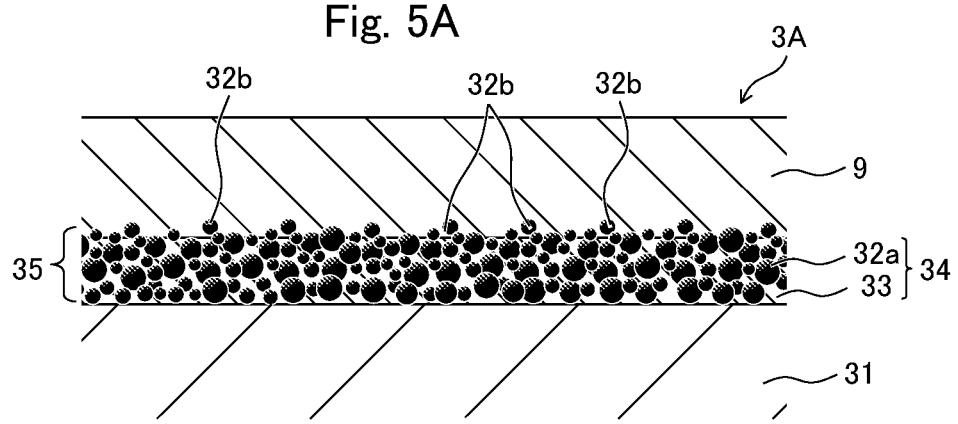
FIG. 5A is a schematic enlarged cross-sectional view of the titanium substrate, the carbon layer, and a resin layer after a step of forming the resin layer illustrated in FIG. 2.
Figure 5B:
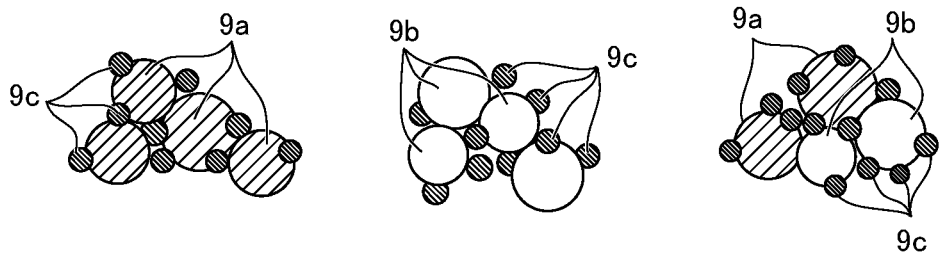
FIG. 5B is a schematic view illustrating the states of resin particles and a dispersant in a suspension in the step of forming the resin layer.
Figure 5C:
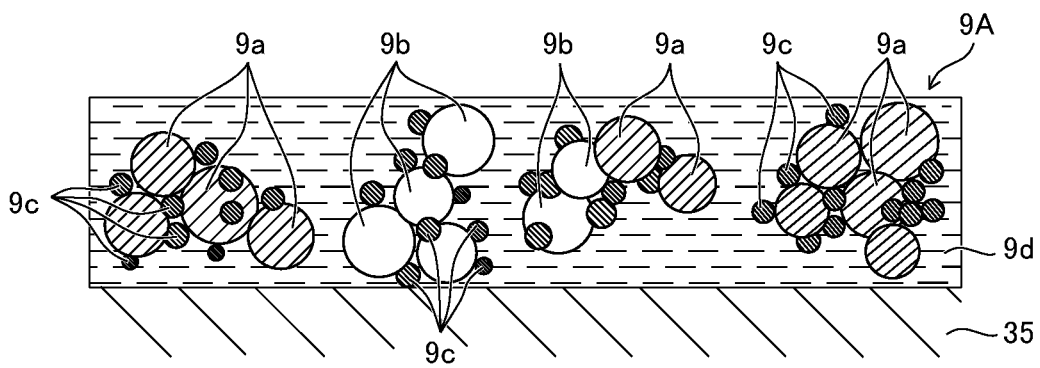
FIG. 5C is a schematic cross-sectional view illustrating a state in which a suspension is applied to the carbon layer.
Figure 5D:
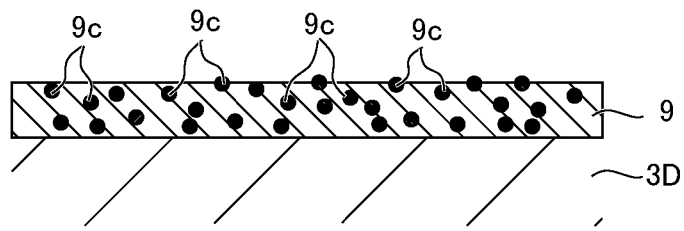
FIG. 5D is a schematic view illustrating the state of the dispersant in the resin layer after the suspension illustrated in FIG. 5C is dried.

Next, the step S3 of forming a resin layer illustrated in FIG. 2 is performed. FIG. 5A is a schematic enlarged cross-sectional view of the titanium substrate 31, the carbon layer 35, and a resin layer 9 after the step S3 of forming the resin layer illustrated in FIG. 2. In addition, FIG. 5B is a schematic view illustrating the states of resin particles 9a, 9b and a dispersant 9c in a suspension 9A in the step S3 of forming the resin layer. FIG. 5C is a schematic cross-sectional view illustrating a state in which the suspension 9A is applied to the carbon layer 35. FIG. 5D is a schematic view illustrating the state of the dispersant 9c in the resin layer 9 after the suspension 9A illustrated in FIG. 5C is dried.

In this step, first, the suspension 9A is prepared. The suspension 9A is obtained by dispersing in a liquid medium 9d the resin particles 9a, 9b made of thermoplastic resin as the base material of the resin layer 9. In this embodiment, the suspension 9A also contains the dispersant 9c made of a fatty acid. Next, as illustrated in FIG. 5C, the suspension 9A is applied to the surface of the carbon layer 35.

The method of application of the suspension 9A may be any method such as, for example, roll coating, spin coating, dip coating, spray coating, die coating, ink jet printing, or gravure coating.

Next, as illustrated in FIGS. 5C and 5D, the resin particles 9a, 9b are heated to a temperature of greater than or equal to the softening point thereof and the liquid medium 9d is dried so that the resin layer 9 is formed on the surface of the carbon layer 35. Accordingly, as illustrated in FIG. 5A, a separator material 3A including the titanium substrate 31, the carbon layer 35 covering the titanium substrate 31, and the resin layer 9 covering the carbon layer 35 can be obtained. The separator material 3A is in a plate shape, and is a material to be press-formed into the separator 3. Hereinafter, the resin particles 9a, 9b, the dispersant 9c, and the liquid medium 9d contained in the suspension 9A will be described.

In this embodiment, two types of the resin particles 9a, 9b are made of different types of thermoplastic resin. The thermoplastic resin may be the one that (1) becomes soft when heated and thus can form the resin layer 9, (2) can secure a sticking force between the resin layer 9 and the carbon layer 35, and does not peel off the carbon layer 35 (specifically, the mixture layer 34) during pressing forming described below, and (3) can be easily removed in removal of the resin layer 9 described below.

Examples of such thermoplastic resin include acrylic resin, vinyl resin, styrene resin, methyl methacrylate-styrene copolymer resin, polycarbonate resin, vinyl resin, polyolefin resin such as polyethylene or polypropylene, polyester resin, polyacetal resin, and nylon resin. Such thermoplastic resin can be used either alone or in combination of two or more.

In this embodiment, the resin particles 9a added to the suspension 9A are acrylic resin, and examples thereof include a homopolymer of (meth)acrylate ester, and a copolymer of (meth)acrylate ester and another monomer that can be copolymerized therewith. Specific examples of (meth)acrylate ester include methyl (meth)acrylate, ethyl (meth)acrylate, and isopropyl (meth)acrylate. Examples of another monomer that can be copolymerized with (meth)acrylate ester include unsaturated carboxylic acids such as (meth)acrylic acid, crotonic acid, maleic acid, fumaric acid, and itaconic acid.

Acrylic resin has a high sticking force to carbon and titanium, and easily dissolves in a strong alkaline solvent when exposed thereto. Therefore, when acrylic resin is used for the resin particles 9a, peeling of the resin layer 9 can be suppressed in a press-forming step S4 described below, and the acrylic resin can dissolved using a strong alkaline solution in a step S5 of removing the resin layer.

The resin particles 9b added to the suspension 9A are vinyl resin, for example, and are added as appropriate to the suspension 9A to secure the strength of the resin layer 9 in the press-forming step S4 described below. Vinyl resin is resin having a vinyl group, and examples thereof include polyvinyl chloride, polyvinyl acetate, polyvinylidene chloride, polyvinyl alcohol, and polyvinyl acetal.

In this embodiment, since vinyl resin is contained in the resin layer 9, damages and the like to the resin layer 9 can be suppressed in the press-forming step S4 described below. Although the resin particles 9b are added to the suspension 9A in this embodiment, the resin particles added to the suspension 9A may be only the resin particles 9a made of acrylic resin, for example, and further, a plurality of types of resin particles made of other types of the aforementioned thermoplastic resin may also be added.

The dispersant 9c added to the suspension 9A may be a fatty acid that does not vaporize or decompose at the softening point of the thermoplastic resin forming the resin particles 9a, 9b. Examples of the fatty acid include a higher fatty acid with 12 to 24 carbon atoms, such as straight-chain saturated fatty acids including lauric acid, myristic acid, pentadecyl acid, palmitic acid, margaric acid, stearic acid, arachidic acid, behenic acid, and lignoceric acid.

When a fatty acid is used for the dispersant 9c, as illustrated in FIG. 5B, the fatty acid is adsorbed to the resin particles 9a made of acrylic resin and the resin particles 9b made of vinyl resin in the suspension 9A, and agglutinate around the resin particles 9a, 9b. In this manner, the resin particles 9a, 9b can be dispersed in the suspension 9A. Further, the dispersant 9c is dispersed in the resin layer 9 formed, and can be used as a lubricant in the press-forming step S4 described below.

Examples of the liquid medium 9d of the suspension 9A include water and alcohol, but are not particularly limited as long as the liquid medium 9d can vaporize at the softening point of thermoplastic resin forming the resin particles 9a, 9b. Further, the dispersant 9c need not be added if the resin particles 9a, 9b can be uniformly dispersed in the liquid medium 9d.

In this manner, when the suspension 9A containing the resin particles 9a, 9b is applied to the surface of the carbon layer 35, the resin particles 9a, 9b can be dispersed on the surface of the carbon layer 35 as illustrated in FIG. 5C. Then, heating the resin particles 9a, 9b to a temperature of greater than or equal to the softening point thereof will allow a more uniform, thinner resin layer 9 to be formed over the carbon layer 35. In this embodiment, the thickness of the resin layer 9 is in the range of 1 to 5 μm, for example.

The resin layer 9 obtained through this step contains thermoplastic resin as a base material of the resin layer, and a lubricant (i.e., the dispersant 9c) dispersed in the resin layer 9, and the thermoplastic resin includes acrylic resin and vinyl resin. More specifically, the resin layer 9 is a layer in which thermoplastic resin forming the resin particles 9a, 9b is deposited by being granularly dispersed, and a fatty acid, which is the dispersant 9c, is dispersed as a lubricant in the resin layer 9, as illustrated in FIG. 5D.

2-4. Regarding press-forming step S4

Figure 6A:
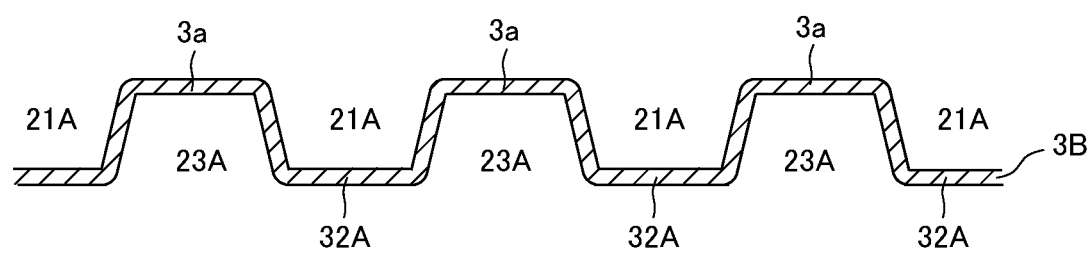
FIG. 6A is a cross-sectional view of the separator after a press-forming step illustrated in FIG. 2.
Figure 6B:
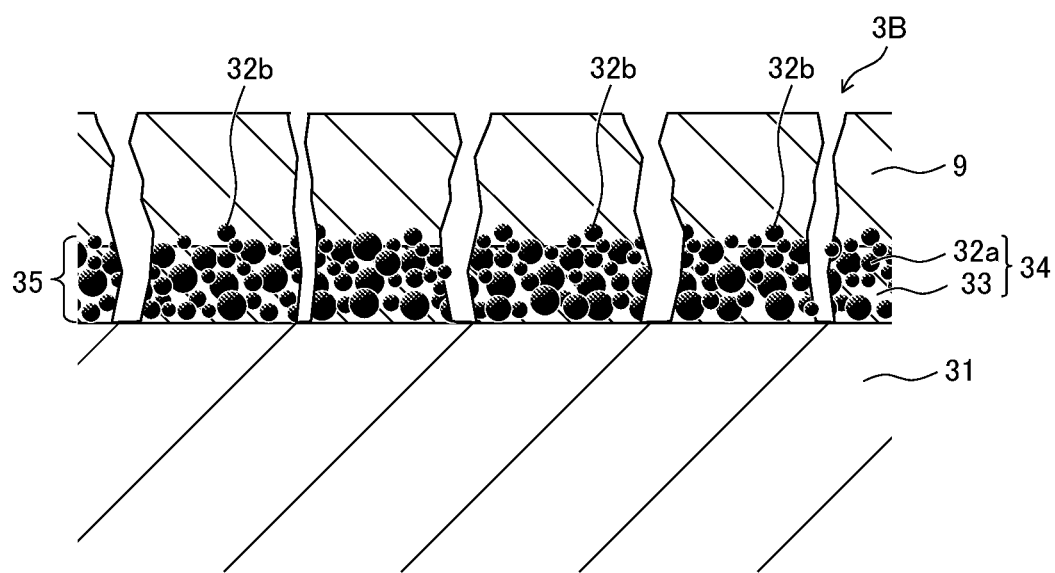
FIG. 6B is a schematic enlarged cross-sectional view of the separator after the press-forming step illustrated in FIG. 6A.

Next, the press-forming step S4 illustrated in FIG. 2 is performed. FIG. 6A is a cross-sectional view of a separator 3B after the press-forming step S4 illustrated in FIG. 2. FIG. 6B is a schematic enlarged cross-sectional view of the separator 3B after the press forming illustrated in FIG. 6A.

In this step, the separator material 3A after the step S3 of forming the resin layer is press-formed into the shape of the separator 3 such that gas flow channels 21A are formed thereon. At this time, cracks are generated in the carbon layer 35 of the separator 3B. However, since the carbon layer 35 is covered with the resin layer 9, there is no possibility that the carbon black 32a, 32b will be detached from the carbon layer 35.

Specifically, since the titanium substrate 31 of the separator material 3A is covered with the carbon layer 35 containing the carbon black 32a, the carbon black 32a is likely to be detached from the carbon layer 35 during press forming. However, such detachment can be avoided by the resin layer 9. In addition, although the redundant carbon black 32b on the surface of the mixture layer 34 is also likely to be detached from the carbon layer 35 during press forming, such detachment can also be avoided by the resin layer 9.

Consequently, there is no possibility that the carbon black 32a, 32b in the carbon layer 35 will stick to the die and the like. Accordingly, pressing defects in the resulting separator 3B due to sticking of the carbon black 32a, 32b derived from the carbon layer 35 to the die can be suppressed. Further, there is no need to apply excess machining oil to the die surface to suppress sticking of the carbon black 32a, 32b in the carbon layer 35 to the die. Therefore, there is no possibility that the press-forming accuracy of the separator 3B will decrease due to the excess machining oil.

In particular, in this embodiment, since the more uniform, thinner resin layer 9 is formed over the carbon layer 35 in the step S3 of forming the resin layer, the press-forming accuracy of the separator 3B in the press forming can be enhanced.

In addition, since the resin layer 9 of the separator material 3A contains acrylic resin with a high sticking force to carbon, titanium, and the like, peeling of the resin layer 9 off the carbon layer 35 can be suppressed during the press forming. Further, since the resin layer 9 contains a dispersant made of a fatty acid dispersed therein, the dispersant functions as a lubricant during the press forming, and thus, press formability can be enhanced.

2-5. Regarding step S5 of removing resin layer

Figure 7:
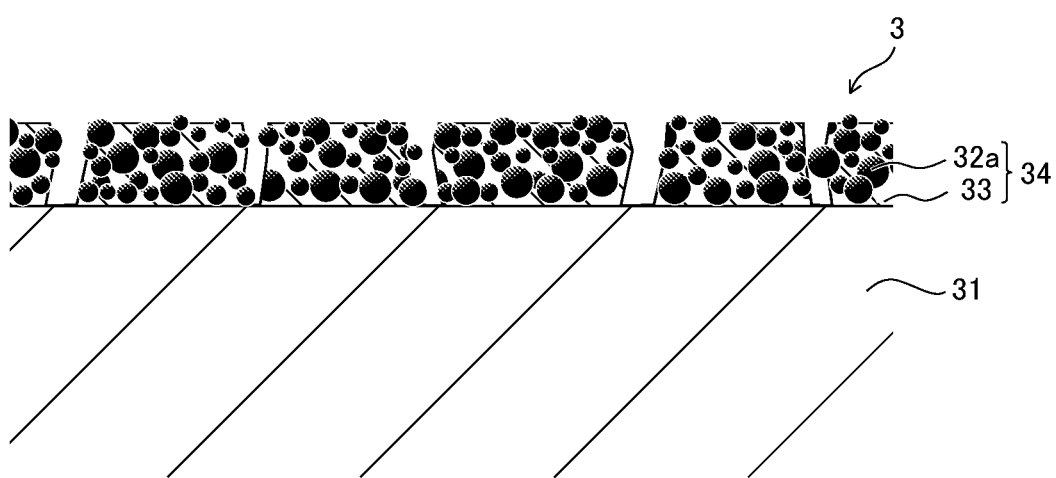
FIG. 7 is a schematic enlarged cross-sectional view of the separator after a step of removing the resin layer illustrated in FIG. 2.

Next, a step S5 of removing the resin layer illustrated in FIG. 2 is performed. FIG. 7 is a schematic enlarged cross-sectional view of the separator 3 after the step S5 of removing the resin layer illustrated in FIG. 2.

This step can obtain the separator 3 by removing the resin layer 9 from the pressed-formed separator 3B. Specifically, in this embodiment, the resin layer 9 of the separator 3B is exposed to a strong alkaline solution with a pH of 9.6 to 13.8 for a predetermined time so that the resin layer 9 is removed. The strong alkaline solvent is an aqueous solution containing sodium carbonate as a main component, for example.

As described above, the acrylic resin contained in the resin layer 9 dissolves in a strong alkaline solvent. Therefore, after the press forming, the resin layer 9 can be easily removed using a strong alkaline solvent without the separator 3 oxidized. Although the resin layer 9 contains vinyl resin in this embodiment, since the resin layer 9 also contains acrylic resin, the resin layer 9 is detached from the separator 3 due to the dissolution of the acrylic resin.

Since the resin layer 9 is formed as a uniform, thin layer in the step S3 of forming the resin layer, the resin layer 9 can be removed from the carbon layer 35 in a short time. Since the redundant carbon black 32b remaining on the carbon layer 35 can be removed in removal of the resin layer 9, the redundant carbon black need not be removed before the press forming. Accordingly, the steps can be simplified.

Although the resin layer 9 is dissolved using a strong alkaline solvent in this embodiment, the solvent may be an organic solvent or the like as long as the resin layer 9 can be removed, and the resin layer 9 may be removed using plasma etching or the like.

Although the illustrative embodiments of the present disclosure have been described in detail above, the present disclosure is not limited thereto, and various design changes can be made within the spirit and scope of the present disclosure recited in the appended claims.

For example, although the redundant carbon black stuck to the surface of the mixture layer is removed in the step of removing the resin layer in the aforementioned embodiment, the redundant carbon black may be removed after the step of forming the mixture layer and before the step of forming the resin layer, for example. Alternatively, in the step of forming the mixture layer, the mixture layer may be formed such that redundant carbon black is not generated.

DESCRIPTION OF SYMBOLS

10 Fuel cell stack
3 Separator
3A Separator material
3B Separator
9 Resin layer
9A Suspension
9a, 9b Resin particles
9c Dispersant (lubricant)
9d Liquid medium
21, 22 Gas flow channels
31 Titanium substrate (metal substrate)
32 Carbon black layer
32a Carbon black
32b Redundant carbon black
33 Titanium oxide
34 Mixture layer
35 Carbon layer

What is claimed is:

1. A method for producing a fuel cell separator, the fuel cell separator having formed thereon a gas flow channel through which one of fuel gas or oxidant gas to be supplied to a fuel cell flows, the method comprising:
    preparing a plate-shaped separator material including a metal substrate, a carbon layer covering the metal substrate, and a resin layer covering the carbon layer;
    press-forming the prepared separator material into a shape of the separator such that the separator has the gas flow channel formed thereon; and
    removing the resin layer entirely from the press-formed separator.

2. The method for producing the fuel cell separator according to claim 1,
    wherein the preparing includes
        preparing as the metal substrate a titanium substrate containing one of titanium or titanium alloy, and applying carbon black to the titanium substrate, thereby forming a carbon black layer, and
        performing heat treatment on the titanium substrate having the carbon black layer formed thereon, thereby diffusing titanium atoms from a surface of the titanium substrate into the carbon black layer, and thus forming a mixture layer as a part of the carbon layer on the surface of the titanium substrate, the mixture layer containing the carbon black of the carbon black layer and titanium oxide holding the carbon black.

3. The method for producing the fuel cell separator according to claim 1,
    wherein the preparing includes applying a suspension to a surface of the carbon layer, the suspension being obtained by dispersing in a liquid medium resin particles of thermoplastic resin as a base material of the resin layer, and heating the resin particles to a temperature of greater than or equal to a softening point of the resin particles and drying the liquid medium, thereby forming the resin layer on the surface of the carbon layer.

4. The method for producing the fuel cell separator according to claim 3,
    wherein:
        the resin particles include resin particles of acrylic resin, and
        the suspension further contains a dispersant made of a fatty acid adapted to disperse the resin particles in the liquid medium.

* * * * *